United States Patent [19]
Pepper

[11] 3,747,894
[45] July 24, 1973

[54] STOP VALVE

[75] Inventor: Kenneth V. Pepper, Davison, Mich.

[73] Assignee: Genova Products, Davison, Mich.

[22] Filed: Dec. 22, 1971

[21] Appl. No.: 210,677

[52] U.S. Cl............... 251/215, 251/288, 251/368
[51] Int. Cl............................................ F16k 31/50
[58] Field of Search................ 251/214, 215, 368, 251/89, 92, 93, 102, 264, 273, 284, 286, 288, 367, 366; 137/315

[56] References Cited
UNITED STATES PATENTS

| | | | |
|---|---|---|---|
| 3,255,775 | 6/1966 | Albro et al.................. | 251/215 X |
| 3,434,694 | 3/1969 | Skinner........................ | 251/215 |
| 3,614,059 | 10/1971 | Rothauser.................... | 251/368 X |

*Primary Examiner*—Martin P. Schwadron
*Assistant Examiner*—David Matthews
*Attorney*—Olsen & Stephenson

[57] ABSTRACT

A thermoplastic stop valve that includes a valve body and an integral valve element and handle. The integral valve element and handle are movable between open and closed positions, and interlocking means are provided so that when the valve element and handle are initially assembled with the valve body the assembled parts are interlocked together to prevent inadvertent removal thereafter of the valve element and handle when moved to an open position.

4 Claims, 3 Drawing Figures

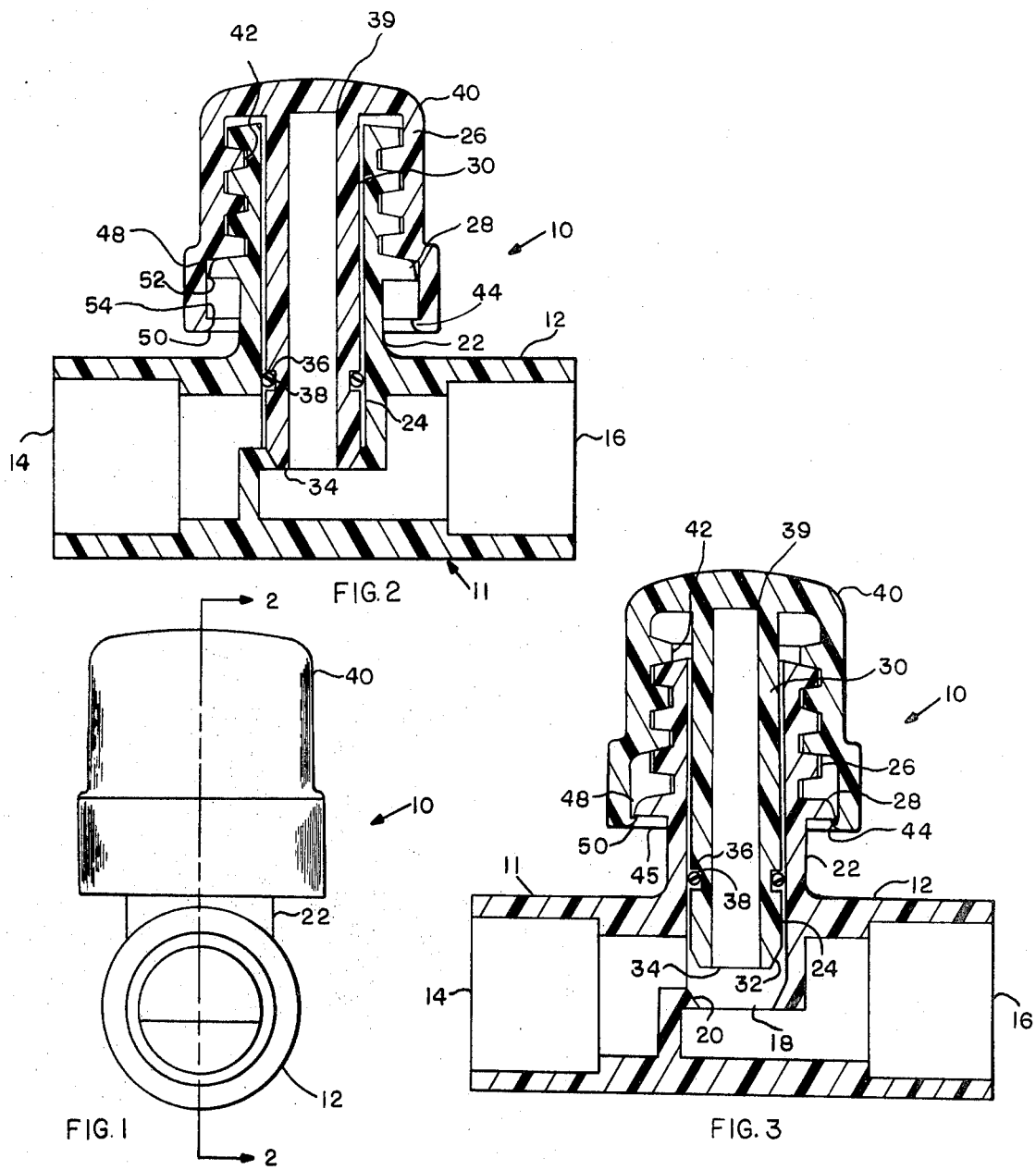

STOP VALVE

BACKGROUND OF THE INVENTION

The present invention relates to stop valves, and particularly to stop valves that are adapted for use in thermoplastic piping systems.

With the advent of thermoplastic pipes and fittings into the plumbing industry, the need has arisen for improved compatible thermoplastic fittings, valves, and the like, analogous to those used in the metal pipe art. A thermoplastic stop valve has an inherent advantage over a metal valve in that no special rubber washers or seats are required for opening and closing the valve, because thermoplastic material seated against thermoplastic material will provide a tight seal. Further, to fully utilize such an inherent advantageous feature, the component parts of the stop valve must be few in number, easy to form, and easy to assemble. In operation, the component parts need to be retained together effectively so that negligent operation in opening the valve will not result in the valve being disassembled and fluid from the plumbing system being discharged through the disassembled valve.

SUMMARY OF THE INVENTION

The present invention provides a thermoplastic stop valve for use with thermoplastic plumbing fixtures and pipes. The stop valve has a valve body or chamber with a protruding hollow stem. A plunger with attached plunger cap fits within the stem and the cap is threaded onto the stem so that as the plunger and cap are rotated the plunger is reciprocated to open and close a valve opening within the chamber. The cap and the stem have annular projections which have mating beveled surfaces that during initial assembly allow the annular projections to override each other as the plunger and cap rotated into the stem. The annular projections also have mating abutting surfaces that inhibit the projections from overriding each other as the plunger and cap are rotated out of the stem. Thus once the valve is assembled, removal of the plunger from the stem during operation of the valve is prevented.

The valve is constructed so that it has a beveled seat that defines the opening for flow of fluid through the valve and the plunger has a beveled end portion which seats in the beveled seat to provide an effective seal between the thermoplastic surfaces.

Thus, it is among the objects of the present invention to provide an improved thermoplastic stop valve for use with a thermoplastic piping system, and further to provide such a valve which requires no special seating surfaces to be added and which resists disassembly during operation.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 is a side elevation view of a stop valve which embodies the present invention;

FIG. 2 is a sectional view of the valve in its closed position, as seen along line 2—2 of FIG. 1; and FIG. 3 is a sectional view similar to FIG. 2 but showing the valve in its open position.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, a thermoplastic stop valve 10 has a valve body 11 that includes a valve chamber 12 with inlet port 14 and outlet port 16. The valve chamber 12 is formed of thermoplastic material and has an opening or port 18 which is defined by an annular beveled seating surface 20 as can best be seen in FIG. 3. The opening 18 provides communication between inlet port 14 and outlet port 16. The valve body also has a hollow stem or cylindrical portion 22 which extends perpendicularly from the valve chamber 12 in axial alignment with the opening on port 18. The stem 22 has a bore 24 which extends above and is concentric with the opening 18. The stem 22 also has a threaded external surface 26 with an annular ridge 28, the purpose of which will be explained later.

The valve 10 also includes a plunger or valve element 30 which is formed of thermoplastic material and which fits in the bore 24. The plunger 30 has a beveled annular seating surface 32 at one end 34 which mates with or seats on the seating surface 20 to seal closed the opening 18 when the plunger 30 is in a lowered or closed position as shown in FIG. 2. Since both seating surfaces 20 and 32 are formed of thermoplastic material, no auxiliary sealing washers or other elements are needed to provide an effective seal. An annular groove 36 in the plunger 30 and a sealing ring 38 creates a seal between plunger 30 and the bore 24.

A cap or handle 40 is attached to the plunger 30 at its upper end 39 so as to enclose the stem 22. The cap 40 has an internal threaded surface 42 which engages threaded surface 26 so that rotation of the cap in one direction or the other will cause the plunger 30 to advance or retract within the bore 24, thus opening or closing the opening 18. The cap 40 also has an annular projection 44 near one end 45 of the cap 40 which interlocks with annular ridge 28. The annular ridge 28 and projection 44 have beveled mating surfaces 48 and 50 respectively which act upon each other during initial assembly to deform the thermoplastic ridge 28 and the thermoplastic projection 44 so that they can override each other as the plunger 30 is rotated into the bore 24. The annular ridge 28 and the annular projection 44 also have abutting surfaces 52 and 54 respectively which constrain the ridge 28 and the projection 44 from overriding each other once the cap 40 is assembled on the stem 22, and thus constrain the plunger 30 from being removed from the bore 24 when the valve is being operated.

What is claimed is:

1. A stop valve comprising a valve body containing a through passageway in which is located a partition with a port for passage of fluid, and a cylindrical hollow portion projecting from one side of the passageway in axial alignment with said port, said cylindrical hollow portion being externally threaded and having an external annular rim located inward of the threads, and an integral valve element and handle therefor, said valve element extending through said cylindrical hollow portion and adapted when in a closed position to seat on said partition to close said port, said handle defining a cap enclosing the outer end of said cylindrical hollow portion, said cap having internal threads threadedly connecting the handle to the externally-threaded cylindrical hollow portion and having an internal annular rim adapted to be pressed over said external annular rim during assembly of the valve body and the handle so as to interlock the valve body and the handle to prevent removal of the latter from the former when the valve element is moved to an open position, said internal and external rims having complementary upper and lower surfaces respectively shaped so that the internal rim will advance axially inward and snap over the external rim as an incedent to screwing the cap of the valve element in one direction onto said cylindrical hollow portion, the complementary lower and upper surfaces respectively of said internal and external rims being shaped for abutting engagement to prevent return movement of the external rim over the internal rim as an incedent to screwing the cap in the other direction.

2. The stop valve that is defined in claim 1, wherein said valve is constructed of thermoplastic material.

3. The stop valve that is defined in claim 1, wherein said complementary upper and lower surfaces respectively of the internal and external rims have convexly curved beveled surfaces to facilitate passage of the external rim over the internal rim when screwing the cap in said one direction.

4. The stop valve that is defined in claim 1, wherein when said valve element is in its closed position said internal rim is spaced axially inward from said external rim, and when said internal rim is in abutting engagement with said external rim said valve element is in a fully open position.

* * * * *